US010935951B2

United States Patent
Gordon et al.

(10) Patent No.: US 10,935,951 B2
(45) Date of Patent: Mar. 2, 2021

(54) AUTONOMOUS OPERATION OF AN ELECTRICAL POWER OUTLET DEVICE

(71) Applicant: International Business Machines Corporation, Armonk, NY (US)

(72) Inventors: Michael S. Gordon, Yorktown Heights, NY (US); Ryan T. Gordon, Yorktown Heights, NY (US); Maja Vukovic, New York, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 40 days.

(21) Appl. No.: 16/373,711

(22) Filed: Apr. 3, 2019

(65) Prior Publication Data

US 2019/0227512 A1 Jul. 25, 2019

Related U.S. Application Data

(63) Continuation of application No. 15/725,347, filed on Oct. 5, 2017, now Pat. No. 10,295,983.

(51) Int. Cl.
*G05B 19/042* (2006.01)
*H01R 13/66* (2006.01)
(Continued)

(52) U.S. Cl.
CPC .......... *G05B 19/0428* (2013.01); *G05B 9/02* (2013.01); *G06F 1/266* (2013.01); *G06F 1/3203* (2013.01);
(Continued)

(58) Field of Classification Search
CPC .......... H02J 9/005; H02J 13/0006; H02J 3/14; H02J 2310/14; H02J 13/0062; H02J 13/0075; H02J 13/0005; H02J 13/00004; H02J 13/00026; H02J 13/00016; Y02B 90/20; Y02B 70/3225; Y02B 70/30;
(Continued)

(56) References Cited

U.S. PATENT DOCUMENTS 9,170,625 B1* 10/2015 Gettings ................. G06F 1/266
9,429,599 B1* 8/2016 Contario .................. H02J 4/00
(Continued)

OTHER PUBLICATIONS

List All IBM Related Applications, Appendix P, 2019.

*Primary Examiner* — Ramesh B Patel
(74) *Attorney, Agent, or Firm* — Garg Law Firm, PLLC; Rakesh Garg; Anthony Curro

(57) ABSTRACT

In an electrical power outlet device, a processor and a memory are configured to execute an application within the outlet device, which computes a pattern of usage of the outlet device. A set of sensors in the outlet device includes a first sensor that is usable to detect an event in an environment in which the outlet device is supplying power. The environment includes elements that are not participating in an electrical circuit that receives power from the outlet device and the event is usable by the application to alter the pattern of usage. An autonomous modification of an operation of the outlet device is performed in response to the pattern of usage, the event, or both. The operation changes (Continued)

a power supplying state of the outlet device without using an external switching apparatus or an external logic implemented outside the outlet device.

20 Claims, 5 Drawing Sheets

(51) Int. Cl.
*H02J 3/14* (2006.01)
*G06F 1/26* (2006.01)
*H01R 31/06* (2006.01)
*G06F 1/3203* (2019.01)
*G05B 9/02* (2006.01)
*H02J 13/00* (2006.01)
*H02J 9/00* (2006.01)

(52) U.S. Cl.
CPC ....... H01R 13/6683 (2013.01); H01R 31/065 (2013.01); H02J 3/14 (2013.01); H02J 13/0006 (2013.01); H02J 9/005 (2013.01); H02J 13/0062 (2013.01); H02J 13/0075 (2013.01); H02J 2310/14 (2020.01)

(58) Field of Classification Search
CPC ....... G05B 19/0428; G05B 9/02; G06F 1/266; G06F 1/3203; G06F 2200/261; H01R 31/065; H01R 13/6683
See application file for complete search history.

(56) References Cited

U.S. PATENT DOCUMENTS

| | | | |
|---|---|---|---|
| 10,295,983 B2* | 5/2019 | Gordon | G05B 19/0428 |
| 10,557,876 B2* | 2/2020 | Frader-Thompson | G01R 21/00 |
| 2009/0195349 A1* | 8/2009 | Frader-Thompson | G01R 21/00 340/3.1 |
| 2011/0121654 A1* | 5/2011 | Recker | H05B 47/19 307/66 |
| 2011/0184580 A1* | 7/2011 | Kawamoto | H04L 67/303 700/295 |
| 2011/0184586 A1* | 7/2011 | Asano | G05B 15/02 700/297 |
| 2012/0080944 A1* | 4/2012 | Recker | H05B 45/10 307/25 |
| 2012/0206050 A1* | 8/2012 | Spero | F21S 41/147 315/152 |
| 2016/0072891 A1* | 3/2016 | Joshi | G06Q 30/0631 370/254 |
| 2016/0195864 A1* | 7/2016 | Kim | H04L 12/2816 709/221 |
| 2017/0181249 A1* | 6/2017 | Takahashi | G08B 13/18 |
| 2017/0223807 A1* | 8/2017 | Recker | H02J 13/00017 |
| 2017/0317494 A1* | 11/2017 | Chapel | G05F 1/66 |

* cited by examiner

AUTONOMOUS OPERATION OF AN ELECTRICAL POWER OUTLET DEVICE

TECHNICAL FIELD

The present invention relates generally to a method, system, and computer program product for a smart electrical power outlet. More particularly, the present invention relates to a method, system, and computer program product for cognitive electrical power outlet device.

BACKGROUND

Hereinafter, a reference to a "power outlet," "power outlet device," "outlet device," and "outlet" are interchangeable references to an electrical power outlet assembly unless expressly disambiguated where used. Electrical power can be tapped from an outlet device by electrically coupling an electrical plug ("plug") end of an electrically conducting cable with the outlet device.

Outlet devices installed on the walls of homes and offices are the most common examples of the outlet devices. Outlet devices can also take the form of surge-strips, movable outlet boxes, outlets presented from another device such as an uninterruptible power supply (UPS), and many other application-specific forms.

Generally, and disregarding any circuit breakers installed in an electrical circuit, a commonly available outlet device is either always On or controlled by a switch. In the always On mode, the outlet is ready and able to provide electrical power whenever a plug is coupled with the outlet. In the switched mode, the outlet is ready and able to provide electrical power whenever a plug is coupled with the outlet and an associated electrical switch is configured in an On position.

It is a common practice to plug an appliance into an outlet and leave the appliance plugged-in for the foreseeable future. When an appliance is not used, generally, users turn the appliance functionality off at the appliance but leave the appliance plugged-in.

Many appliances have built-in smart modes which enable the appliance to place itself in a standby configuration when the appliance is not in use. In the standby mode, the appliance awaits an input to return to a mode where the appliance can be used.

SUMMARY

The illustrative embodiments provide a method, system, and computer program product. An embodiment includes a method that configures in an electrical power outlet device, a processor and a memory to execute an application within the electrical power outlet device, wherein the application computes a pattern of usage of the electrical power outlet device. The embodiment configures in the electrical power outlet device, a set of sensors, a first sensor in the set of sensors being usable to detect an event in an environment wherein the electrical power outlet device is supplying power, wherein the environment comprises elements that are not participating in an electrical circuit that receives power from the electrical power outlet device, and wherein the event is usable by the application to alter the pattern of usage. The embodiment performs an autonomous modification of an operation of the electrical power outlet device responsive to at least one of the pattern of usage and the event, wherein the operation comprises changing a power supplying state of the electrical power outlet device, and wherein the autonomous modification changes the state without using an external switching apparatus and an external logic implemented outside the electrical power outlet device.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
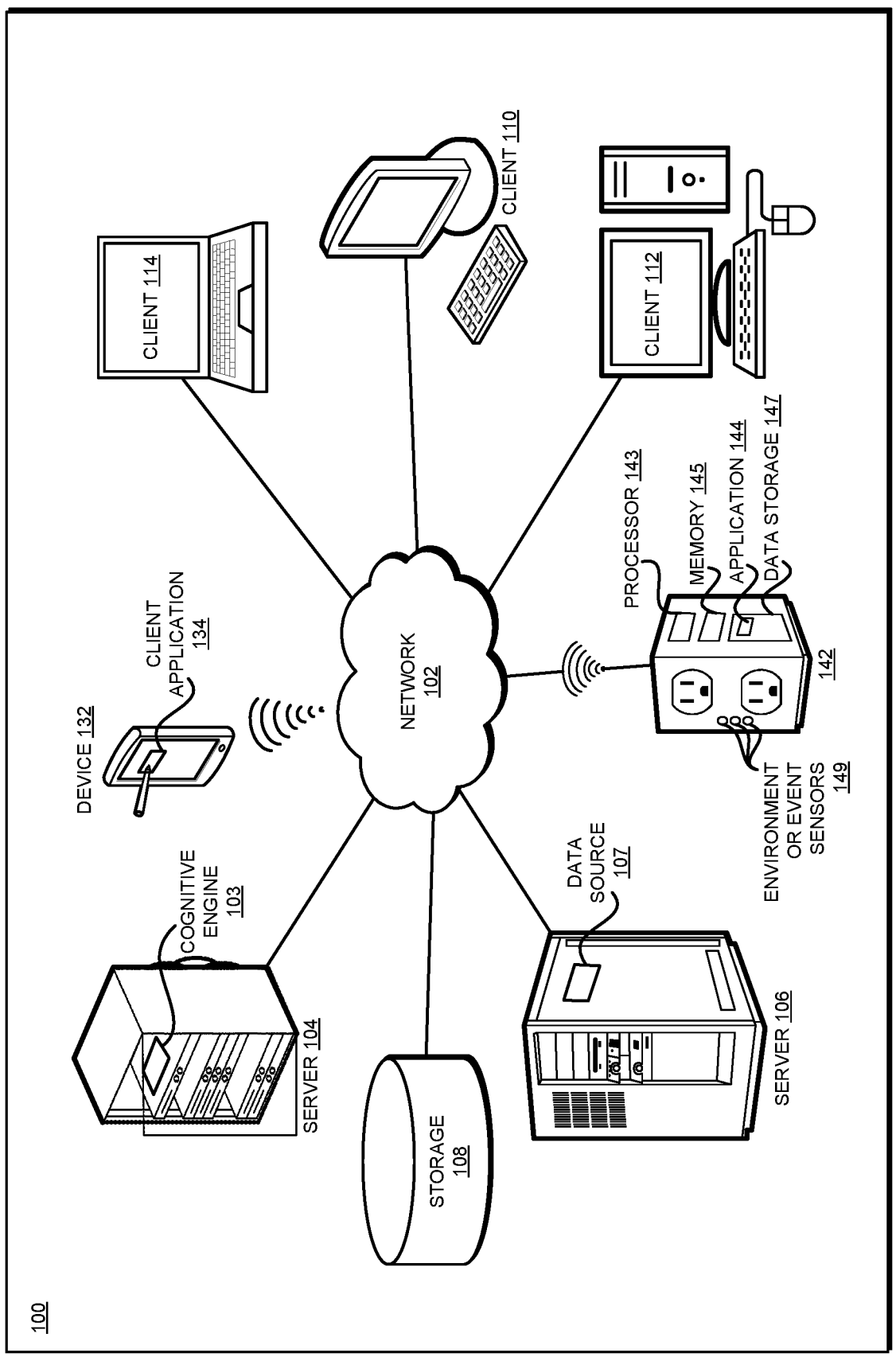
FIG. 1 depicts a block diagram of a network of data processing systems in which illustrative embodiments may be implemented.

The illustrative embodiments recognize that most outlets are passive devices which are controlled or otherwise put into use by a separate entity such as a switch or appliance in the electrical circuit of which the outlet is a part. The illustrative embodiments recognize that presently, barring an electrical failure in an outlet device, the outlet itself is not capable of determining whether to supply electrical power under certain circumstances. In other words, even if a switch controlling an outlet were set in an On position, an appliance was plugged into the outlet and configured to draw electrical power from the outlet, the outlet is not configured with independent logic-processing facility contained within the outlet device, to analyze a circumstance and determine whether the outlet device should supply electrical power.

The illustrative embodiments recognize that many appliances even when their intended functionality has been turned off or when they have been placed in a standby mode continue to draw electrical power from the outlet. For example, a microwave appliance that is plugged in but has been turned off or is otherwise not in use will continue to draw electrical power for a clock displayed on the appliance. As another example, a cable television set-top box in standby mode draws electrical power to continue to operate an internal clock and determine whether it is time to wake up and record a scheduled programming. Many such examples of trickle power draw by appliances are well-known to most consumers of electrical power.

The illustrative embodiments further recognize that many factors other than the switch or the appliance associated with an outlet play a significant role in determining whether the outlet should supply electrical power. For example, the illustrative embodiments recognize that when an infant is playing near the outlet, it is desirable that the outlet autonomously be capable of ceasing electrical power supply regardless of a position of an associated switch or a mode of an associated appliance. An autonomous operation of an outlet device is an operation determined, selected, and performed by the outlet device itself, without using a separate switching device, logic implemented in a plugged-in appliance, or data processing system external to the outlet device.

The illustrative embodiments recognize that many other non-electrical events that occur in an unplanned or sporadic manner—outside the electrical circuit of the outlet device—can be useful in determining whether the outlet should maintain or cease the capability to supply power. For example, the detection of an electrical storm in the proximity of the outlet should allow the outlet to determine whether to cease supplying power.

Many environmental factors—which do not occur in the electrical circuit of the outlet device—also play a role in determining whether an outlet should autonomously terminate electrical power supply. As one example, the illustrative embodiments recognize as an ambient temperature reaches a threshold, the electrical power supply to a heater should be autonomously terminated from the outlet regardless of the temperature sensed by the often-inaccurate thermostats in the heater devices.

As another example, as the temperature of a device—whose battery is being charged—exceeds a threshold, the power supply to the charging circuit should be disconnected to avoid the risk of fire in a Lithium ion battery. As another example, an electrical storm in the proximity of the outlet should allow the outlet to determine whether to cease supplying power if a computer or other sensitive electronic appliance is connected to the outlet. However, the same storm may not warrant disconnecting the power supply if the connected appliance is not a sensitive electronic appliance, for example, a coffee machine.

The illustrative embodiments recognize that the presently available tools or solutions do not address these needs/problems or provide adequate solutions for these needs/problems. The illustrative embodiments used to describe the invention generally address and solve the above-described problems and other related problems by cognitive electrical power outlet device.

An embodiment can be implemented as a combination of certain hardware components and a software application. An implementation of an embodiment, or one or more components thereof, can be configured as a modification of an existing outlet device, with a companion software application executing in the outlet device itself. Optionally, as needed, the application embedded in the outlet device can determine to use source of data and/or computing resources situated external to the outlet device and accessible from the outlet device over a data network, e.g., over short-range radio (such as Bluetooth), over a wired or wireless local area network (LAN), or over a wide area network (WAN).

An embodiment configures an outlet device such that a processor, memory, and a suitable data storage unit are included in the same enclosure as the pins or ports from which electrical power can be tapped from the outlet. The embodiment configures an application, or at least some components thereof, as described herein, in the data storage unit within the enclosure. The application, when executed using the processor and the memory within the enclosure add a cognitive computing functionality to the outlet device of the enclosure. Such enabled outlet device within the enclosure is hereinafter referred to as an improved outlet device. An autonomous operation of an improved outlet device is an operation that is determined, selected, and performed by the outlet device itself, without using a separate switching device, logic implemented in a plugged-in appliance, or data processing system external to the improved outlet device.

As described herein, as an optional feature, an improved outlet device can be configured to source of data and/or computing resources situated external to the improved outlet device. For use in such cases, optionally, one embodiment also configures a data communication component in the improved outlet device for communicating with the external data sources and/or computing resources.

An embodiment further configures the improved outlet device with one or more sensors. A sensor is capable of detecting an attribute of an environment that exists outside the electrical circuit to which the improved outlet device is supplying power, a non-electrical event occurring in the environment, or both. Some non-limiting examples of environmental attributes include—temperature, humidity, wind speed, atmospheric pressure, presence of ambient static electrical charge, presence or absence of a gas or compound, presence of a certain particulate matter, presence or absence of sound, presence or absence of light, presence of certain electromagnetic radiation, fluctuations in the input voltage, and many others.

Some non-limiting examples of non-electrical events transpiring in an environment include—appearance of a person or object (such as an infant) within a defined distance or view from a point (e.g., from an improved outlet device), a rate of change of static electricity in the air exceeding a threshold, a rate of change of a temperature exceeding a threshold, appearance of a sound of a given frequency or range of frequencies, appearance of a sound pattern, rate of change of an amplitude of sound, absolute atmospheric pressure, rate of change of atmospheric pressure, and many others. Suitable sensors for the detection of these and other attributes and events are configurable in the improved outlet device within the scope of the illustrative embodiments.

An embodiment monitors the usage pattern of the improved outlet device. For example, the embodiment determines the days and times when the outlet of the improved outlet device is supplying electrical power that exceeds a trickle power flow threshold (e.g., when one or more devices connected to the improved outlet are in use). In some cases, a usage pattern of a device or appliance connected to the improved outlet device can be monitored, and a usage pattern of an improved outlet device can be deduced from the usage pattern of a device or appliance connected to the improved outlet device.

From the observed usage data, the embodiment applies known techniques of cognitive computing to determine a pattern of usage of the outlet in the improved outlet device. From the pattern, and using known techniques for forecasting future use, the embodiment forecasts a pattern of usage that is likely to occur over a future period.

The embodiment allows the improved outlet device to autonomously maintain electrical power delivery according to the computed pattern when the power demand exceeds the trickle power flow threshold. When the power demand reduces to the trickle power flow threshold or below, the improved outlet device autonomously ceases electrical power delivery completely—i.e., attaining as near 0 Volt-Amperes (0 VA or 0 Watts) as possible in the electrical circuit where the improved outlet device is implemented and without allowing the trickle power flow described earlier. Autonomously adjusting an operation of the improved outlet device in this manner, the improved outlet device of an embodiment reduces electrical power wastage by preventing trickle power draw without requiring a configuration change at the plugged-in appliance or a deliberate operation of an external switching device coupled with the outlet. The autonomous adjustment of the operations of the improved outlet device further enable sensing a demand change—i.e., when the power demand exceeds the trickle power threshold—and automatically triggering the improved outlet device to begin delivering power.

An embodiment further determines whether an environmental attribute detected by a sensor on the improved outlet device exceeds a threshold value set for that attribute in the improved outlet device. If the forecasted pattern of operation calls for an operation that is inconsistent with the desired operation during the existence of the higher-than (or lower-than) threshold value of the environmental attribute, the embodiment adjusts the operation autonomously at the improved outlet device. The adjustment causes the improved outlet device to operate in a manner that is consistent with the desired operation during the existence of the value of the environmental attribute.

For example, suppose that the pattern calls for the outlet to deliver power at time T, but the static charge in the ambient air is higher than a threshold amount of charge due to an electrical storm at time T (or a forecasted charge from the charge at time T−x). Under such a circumstance, the autonomous adjustment causes the outlet to not deliver power at time T but deliver power (if the pattern calls for delivery) at T+y when the charge has actually subsided or is forecasted to or below the threshold.

As another example, suppose that the pattern calls for the outlet to deliver power during a period P, but the improved outlet device detects an example event—the presence of an infant in a defined proximity, e.g., by detecting a sound pattern of the infant, a touch by the infant, an image of the infant in a camera view, and the like. Suppose that the presence period P of the infant lasts through a time T when power delivery from the improved outlet device is supposed to be enabled according to a pattern. Under such an example circumstance, the autonomous adjustment causes the outlet to not deliver power at time T but deliver power (if the pattern calls for delivery) at T+y when period of the infant's presence has elapsed, the infant is no longer present in the vicinity of the improved outlet device.

These examples of patterns, attributes, events, operations, and adjustments are not intended to be limiting. From this disclosure, those of ordinary skill in the art will be able to conceive many other patterns, attributes, operations, and adjustments, and the same are contemplated within the scope of the illustrative embodiments.

The manner of cognitive electrical power outlet device described herein is unavailable in the presently available methods. A method of an embodiment described herein, when implemented to execute on an outlet device and an optional data processing system, comprises substantial advancement of the functionality of that outlet device and the optional data processing system in autonomously and cognitively determining when to maintain or cease electrical power delivery from the outlet.

The illustrative embodiments are described with respect to certain types of outlets, appliances, trickle power draws, environments, attributes, events, operations, enclosures, patterns, adjustments, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
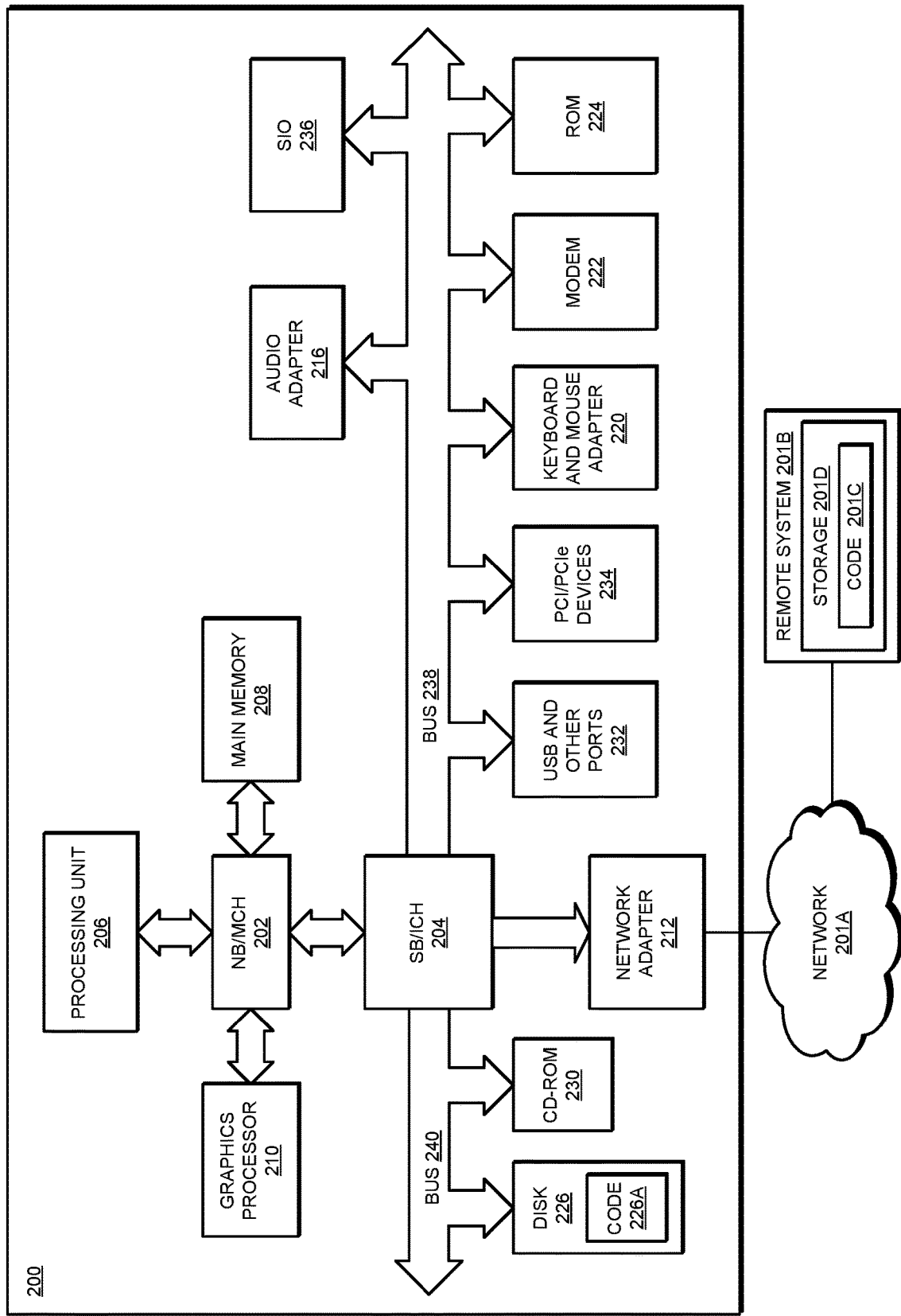
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, an Internet of Things (IoT) device or sensor, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Improved outlet device 142 is an example of an improved outlet device described herein and implements an embodiment. For example, application 144 in improved outlet device 142 implements one or more functions described herein, and causes one or more autonomous operations of improved outlet device 142 as described herein. Application 144 executes in improved outlet device 142 using processor 143, memory 145, and data storage device 147 configured within an enclosure of improved outlet device 142. Sensors 149 are a set of sensors suitable and configured for detecting one or more environmental attributes and/or events, in a manner described herein. Optionally, improved outlet device 142 is configured with a data communication capability to communicate over network 102, e.g., with a remote cognitive engine and/or an external data source such as data source 107.

For example, a user's social data may be available from a social media data source 107, and such data is used by application 144 in the cognitive computing and forecasting of a usage pattern. For example, the social data may indicate that a future gathering will (or will not) occur at a location served by improved outlet device 142, where the lighting, air-conditioning, alarm system, televisions, cable TV boxes, or another system or appliance may be needed (or not needed) during period P. Accordingly, application 144 may adjust the forecasted pattern of power usage during period P and trigger an autonomous operation described herein.

As another example, a user's calendar data may be available from a calendar server data source 107, and such data is used by application 144 in the cognitive computing and forecasting of a usage pattern. For example, the calendar data may indicate that the user will (or will not) be present at a location served by improved outlet device 142, where the lighting, air-conditioning, alarm system, televisions, cable TV boxes, or another system or appliance may be needed (or not needed) during period P. Accordingly, application 144 may adjust the forecasted pattern of power usage during period P and trigger an autonomous operation described herein.

A user can optionally interact with improved outlet device 142 and manipulate or override an autonomous operation of improved outlet device 142. For example, optional client application 134 on data processing device 132 associated with the user can receive pattern information, autonomous operation information, event detection information, environmental factor information and other information described herein from improved outlet device 142. Client application 134 can also change the pattern information, supply improved outlet device 142 with data usable in a function described herein (e.g., provide user's calendar data), manually override an autonomous operation (turn improved outlet device 142 On when an autonomous operation has turned improved outlet device 142 Off, and vice versa).

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 and improved outlet device 142 in FIG. 1 in which computer usable program code or instructions implementing the processes of the illustrative embodiments may be located. Data processing system 200 is described as a computer only as an example, without being limited thereto. Implementations in the form of other devices, such as device 132 or improved outlet device 142 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 144 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
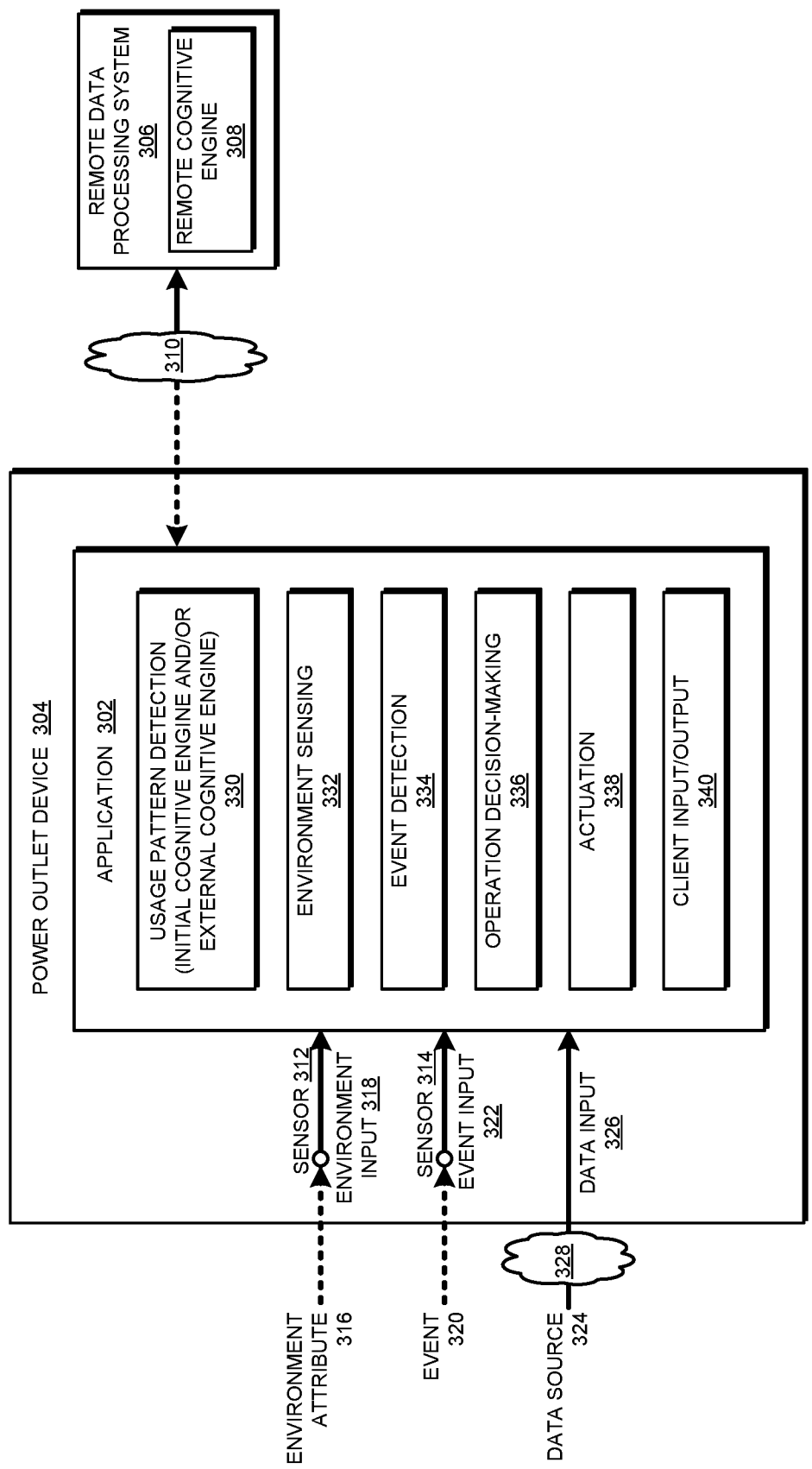
FIG. 3 depicts a block diagram of an example configuration for cognitive electrical power outlet device in accordance with an illustrative embodiment.

With reference to FIG. 3, this figure depicts a block diagram of an example configuration for cognitive electrical power outlet device in accordance with an illustrative embodiment. Application 302 is an example of application 144 in FIG. 1. Power outlet device 304 is an example of improved outlet device 142 in FIG. 1. Remote data processing system 306 is an example of server 104 in FIG. 1.

Remote data processing system 306 includes remote cognitive engine 308, and is reachable over network 310 from improved outlet device 304 using a suitable type of network connectivity. As described herein, accessing remote data processing system 306 with remote cognitive engine 308 over network 310 is an optional feature, such as when a particular type of cognitive computing, computing resources needed, the amount of external data needed, or the location of the data for cognitive computation is more readily available external to improved outlet device 304.

Sensors 312 and 314 are non-limiting examples of sensors 149 in FIG. 1. For example, sensor 312 is configured to detect, sense, or capture environmental attribute 316, and provide environmental input 318 to application 302. Similarly, sensor 314 is configured to detect, sense, or capture event 320, and provide event input 322 to application 302. In some cases, external data sources, such as source 324 may be able to provide data input 326 over network 328. As a non-limiting example, network 328 may be a network utilized for interoperating Internet of Things (IoT) devices.

Component 330 implements a cognitive computing engine to detect and forecast usage patterns of power provided by improved outlet device 304. Component 330 implements one or more cognitive algorithms for pattern detection, one or more forecasting models to predict a future occurrence in the pattern, or both.

In one embodiment, component 330 is optimized to operate using processing and data storage capabilities of improved outlet device 304 that are far smaller than those of remote data processing system 306. As a non-limiting example, component 330 may be configured to operate using Raspberry Pi type of processing and memory configurations, as compared to the resources available at a general-purpose home computer or in a datacenter server.

Component 332 processes environment input 318. Component 332 determines whether an environmental factor exceeds a corresponding threshold and produces one or more outputs that are usable in the autonomous adjustments at improved outlet device 304.

Component 334 processes event input 322. Component 334 determines whether a configured event has occurred, and produces one or more outputs that are usable in the autonomous adjustments at improved outlet device 304.

Component 336 uses the outputs of component 330, 332, and 334 in determining whether a deviation from the pattern of component 330 is justified based on the output of component 332, 334, or both. When justified, component 336 sends an instruction to component 338 to cause an autonomous operation at improved outlet device 304.

Component 338 interacts with an electrical operation of improved outlet device 304. Particularly, component 338 autonomously actuates an implementation-specific electro-mechanical or electronic apparatus (not shown) in improved outlet device 304 to cause the flow of electrical current from improved outlet device 304 to an appliance to turn On, stay On, turn Off, or remain Off at time T or for period P, as the case may be.

When optional client application 134 of FIG. 1 is implemented, component 340 accepts optional inputs from client application 134, provides data outputs to client application 134, or both.

Figure 4:
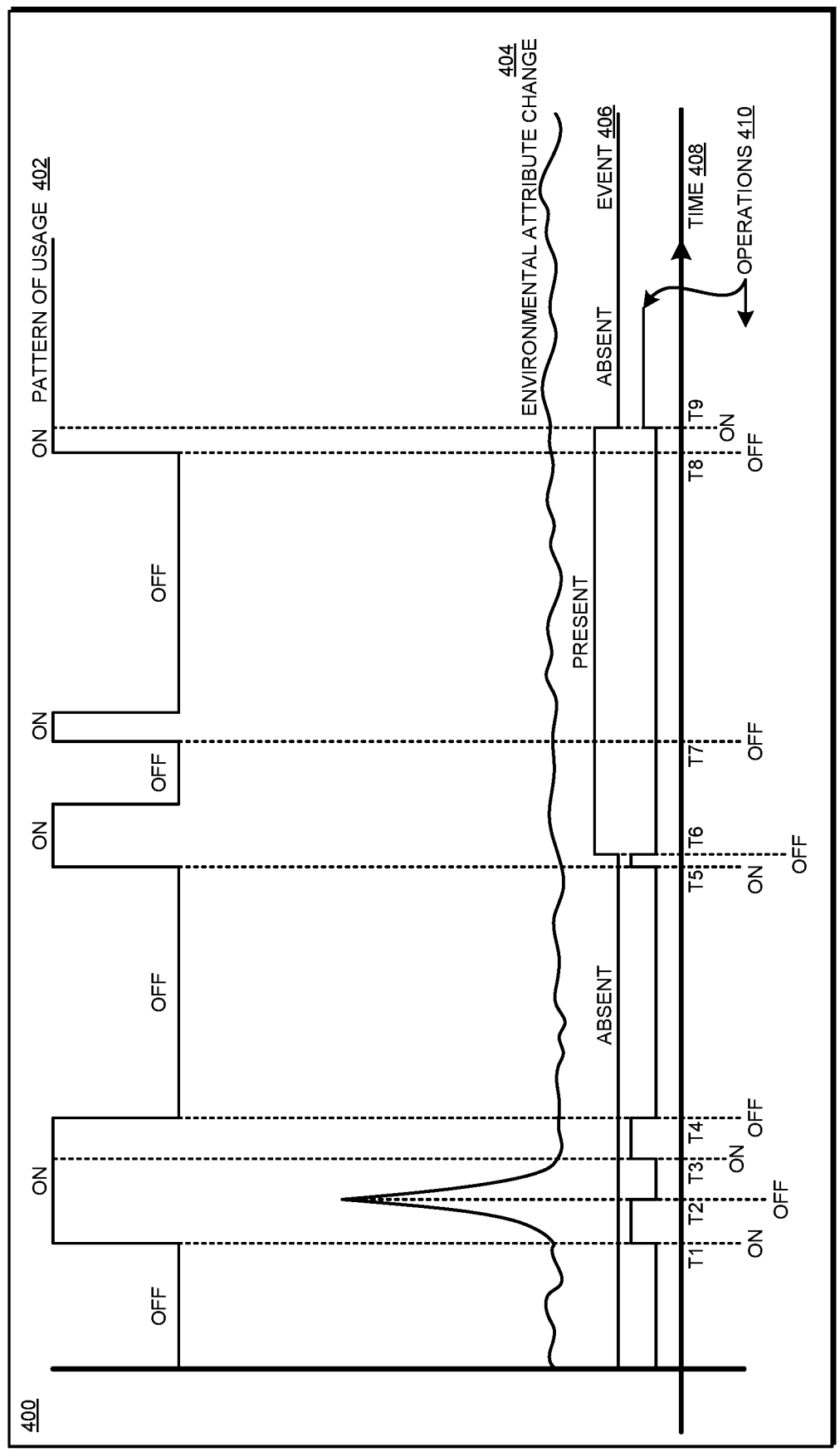
FIG. 4 depicts a graph plot of an example operation of an improved outlet device in accordance with an illustrative embodiment.

With reference to FIG. 4, this figure depicts a graph plot of an example operation of an improved outlet device in accordance with an illustrative embodiment. Graph 400 is an example graph of a non-limiting example operation of improved outlet device 304, using application 302, in FIG. 3.

Graph 402 represents an example power On and power Off pattern for the improved outlet device. Graph 404 represents the variations in the value of an example environmental attribute, e.g., a lightning storm. Graph 406 represents the occurrence or non-occurrence of an example event, e.g., the presence of an infant in a defined vicinity of the improved outlet device.

Graphs 402, 404, and 406 are plotted on an example timeline 408. Autonomous operations 410 of the improved outlet device are shown along timeline 408 as well and relative to graphs 402, 404, and 406.

Suppose that according to pattern 402, at time T1, the improved outlet device should turn On. The improved outlet device turns On at T1. At time T2, the improved outlet device (using a sensor and the application) detects a change in the environmental attribute, e.g., a spike in the ambient static electricity resulting from the lightning storm. The application in the improved outlet device determines that the spike value of the attribute exceeds a threshold such that the spike would be harmful and remain harmful to sensitive electronics, such as computers.

Suppose that a computer is plugged into the improved outlet device (the improved outlet device detects a type of the appliance plugged in from the patterns of usage in graph 402, or information supplied by the user.) The improved outlet device autonomously turns the power Off at time T2 or as quickly as possible considering the limits of the presently available power switching technology. The improved outlet device keeps the power turned Off until time T3 even though pattern 402 suggests that the power should be On between T2 and T3. The improved outlet device turns the power Off at T4 according to pattern 402 (see the plot of operations 410 of the improved outlet device).

The improved outlet device turns the power On again at T5 according to pattern 402 (see the plot of operations 410 of the improved outlet device). At time T6, the improved outlet device (using a sensor and the application) detects an event, e.g., an infant coming within an audible, visible, or tactile range of the improved outlet device. The application in the improved outlet device determines that a power On state of the improved outlet device during the event would be harmful, e.g., would pose an electrocution risk to the infant.

The improved outlet device autonomously turns the power Off at time T6 or as quickly as possible considering the limits of the presently available power switching technology (see the plot of operations 410 of the improved outlet device). The improved outlet device keeps the power turned Off until time T7 even though pattern 402 suggests that the power should be On for at least some period between T6 and T7 and turn On again at T7 (see the plot of operations 410 of the improved outlet device). The improved outlet device detects that the event is still present at time T7 and keeps the power Off (see the plot of operations 410 of the improved outlet device). The improved outlet device detects that the event is still present at time T8 and keeps the power Off even though pattern 402 suggests that the power should be On at T8 (see the plot of operations 410 of the improved outlet device). The improved outlet device detects that the event is no longer present at time T9 and turns the power On according to pattern 402 (see the plot of operations 410 of the improved outlet device).

Figure 5:
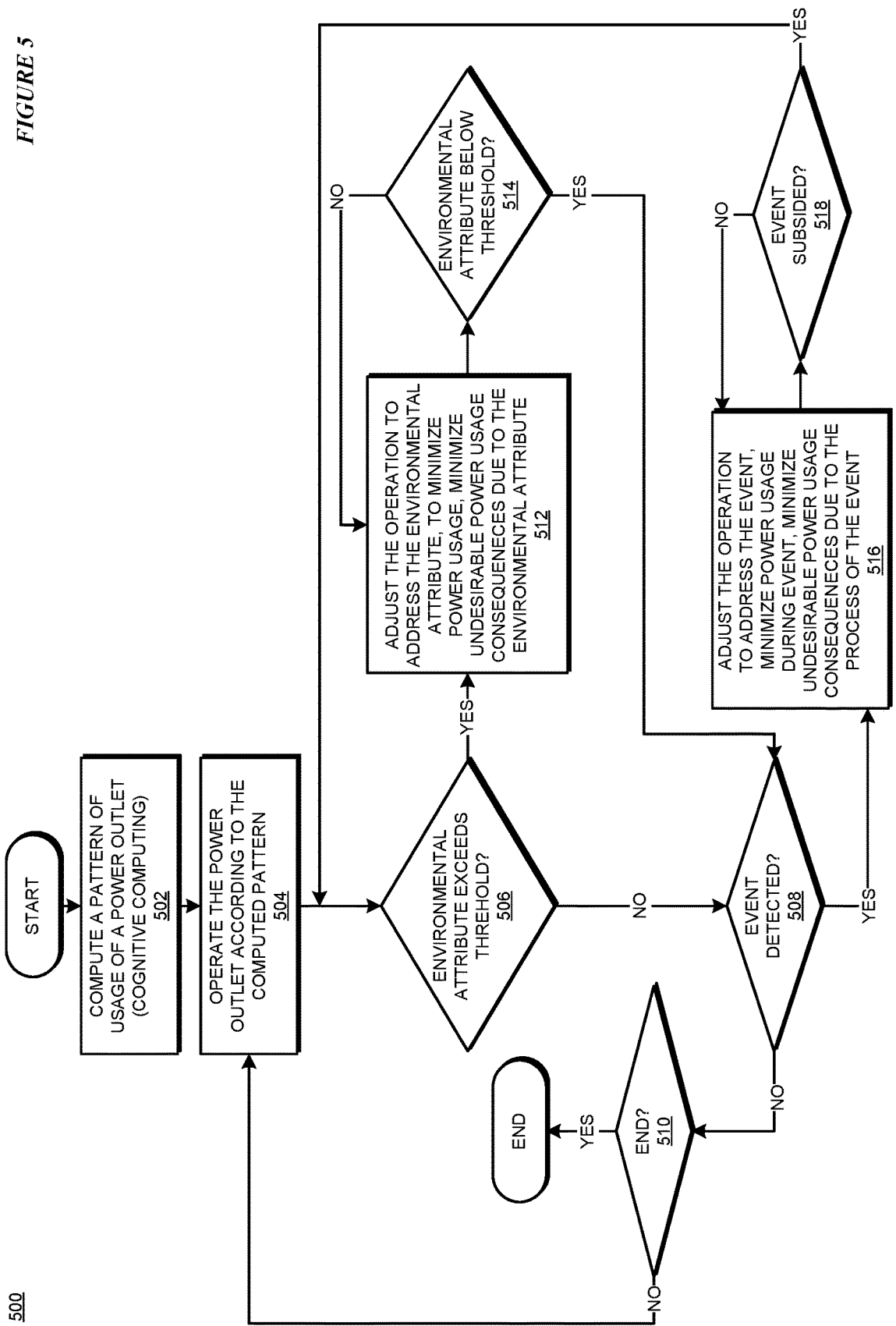
FIG. 5 depicts a flowchart of an example process of operation of a cognitive electrical power outlet device in accordance with an illustrative embodiment.

With reference to FIG. 5, this figure depicts a flowchart of an example process of operation of a cognitive electrical power outlet device in accordance with an illustrative embodiment. Process 500 can be implemented in application 302 in FIG. 3, which executes in improved outlet device 304 in FIG. 3.

The application computes a pattern of usage of the improved outlet device (block 502). The application operates the improved outlet device according to the computed pattern (block 504).

The application determines whether an environmental attribute exceeds a threshold (block 506). If no environmental attribute exceeds a corresponding threshold ("No" path of block 506), the application determines whether an event has been detected (block 508). If no event is detected ("No" path of block 508), the application determines whether to end process 500 (block 510). If the process should not end ("No" path of block 512), the application returns to block 504. If the process should end ("Yes" path of block 512), the application ends process 500 thereafter.

At block 506, if an environmental attribute exceeds a corresponding threshold ("Yes" path of block 506), the application autonomously adjusts the operation of the improved outlet device to address the environmental attribute, to minimize the power usage, to minimize an undesirable consequence of power usage during the period when the attribute exceeds the threshold, or some combination thereof (block 512).

The application determines whether the attribute value has reduced to or below the threshold (block 514). If the value has reduced to or below the threshold ("Yes" path of block 514), the application proceeds to block 508. If the value has not reduced to or below the threshold ("No" path of block 514), the application returns to block 512.

At block 508, if an event has been detected ("Yes" path of block 508), the application autonomously adjusts the operation of the improved outlet device to address the event, to minimize the power usage during the event, to minimize an undesirable consequence of power usage during the event, or some combination thereof (block 516).

The application determines whether the event has subsided (block 518). If the event has subsided ("Yes" path of block 518), the application proceeds to block 506. If the event has not subsided ("No" path of block 518), the application returns to block 516. Eventually, as described earlier, the application ends process 500.

Thus, a computer implemented method, system or apparatus, and computer program product are provided in the illustrative embodiments for cognitive electrical power outlet device and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, including but not limited to computer-readable storage devices as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   configuring in an electrical power outlet device, a set of sensors, a first sensor in the set of sensors configured to detect an event in an environment where the electrical power outlet device is supplying power, the environment comprising elements not participating in an electrical circuit that receives power from the electrical circuit, wherein the event is usable by an application executing in the electrical power outlet device to alter a pattern of usage computed at the electrical power outlet device;
   determining, using the application within the electrical power outlet device, an autonomous modification of an operation of the electrical power outlet device to be performed responsive to at least one of the pattern of usage and the event; and
   performing, by the electrical power outlet device, the autonomous modification at the electrical power outlet device.

2. The method of claim 1, wherein when a current drawn from the electrical power outlet device fails to exceed a current threshold, the autonomous modification ceases a flow of the current to an appliance that is electrically coupled to the electrical power outlet device.

3. The method of claim 1, further comprising:
   configuring a second sensor in the set of sensors to detect a value of an environmental attribute, and wherein the environmental attribute is usable by the application to alter the pattern of usage.

4. The method of claim 1, wherein the event comprises an occurrence of a non-electrical nature, and wherein the event of the non-electrical nature occurs outside the electrical circuit to which the electrical power outlet device is supplying electrical power.

5. The method of claim 4, wherein the event comprises a presence of a person within a distance range from the electrical power outlet device, and wherein the presence is detected using the first sensor by detecting a pattern of sound associated with the person.

6. The method of claim 4, wherein the event comprises a presence of a person within a distance range from the electrical power outlet device, and wherein the presence is detected using the first sensor by detecting a visual pattern associated with the person in an image captured by the first sensor.

7. The method of claim 1, wherein the pattern of usage comprises a sequence of periods, wherein the electrical power outlet device is turned ON during a period in the sequence and turned OFF during another period in the sequence.

8. The method of claim 1, further comprising:
   receiving external data at the electrical power outlet device, wherein the external data comprises a calendar information of a user; and
   performing an autonomous alteration of the pattern of usage of the electrical power outlet device, wherein the autonomous alteration changes the pattern without using an external switching apparatus and an external logic.

9. A computer usable program product comprising one or more computer-readable storage devices, and program instructions stored on at least one of the one or more storage devices, the stored program instructions comprising:

program instructions to configure in an electrical power outlet device, a set of sensors, a first sensor in the set of sensors configured to detect an event in an environment where the electrical power outlet device is supplying power, the environment comprising elements not participating in an electrical circuit that receives power from the electrical circuit, wherein the event is usable by an application executing in the electrical power outlet device to alter a pattern of usage computed at the electrical power outlet device;

program instructions to determine, using the application within the electrical power outlet device, an autonomous modification of an operation of the electrical power outlet device to be performed responsive to at least one of the pattern of usage and the event; and program instructions to perform, by the electrical power outlet device, the autonomous modification at the electrical power outlet device.

10. The computer usable program product of claim 9, wherein when a current drawn from the electrical power outlet device fails to exceed a current threshold, the autonomous modification ceases a flow of the current to an appliance that is electrically coupled to the electrical power outlet device.

11. The computer usable program product of claim 9, further comprising:

program instructions to configure a second sensor in the set of sensors to detect a value of an environmental attribute, and wherein the environmental attribute is usable by the application to alter the pattern of usage.

12. The computer usable program product of claim 9, wherein the event comprises an occurrence of a non-electrical nature, and wherein the event of the non-electrical nature occurs outside the electrical circuit to which the electrical power outlet device is supplying electrical power.

13. The computer usable program product of claim 12, wherein the event comprises a presence of a person within a distance range from the electrical power outlet device, and wherein the presence is detected using the first sensor by detecting a pattern of sound associated with the person.

14. The computer usable program product of claim 12, wherein the event comprises a presence of a person within a distance range from the electrical power outlet device, and wherein the presence is detected using the first sensor by detecting a visual pattern associated with the person in an image captured by the first sensor.

15. The computer usable program product of claim 9, wherein the pattern of usage comprises a sequence of periods, wherein the electrical power outlet device is turned ON during a period in the sequence and turned OFF during another period in the sequence.

16. The computer usable program product of claim 9, further comprising:

program instructions to receive external data at the electrical power outlet device, wherein the external data comprises a calendar information of a user; and program instructions to perform an autonomous alteration of the pattern of usage of the electrical power outlet device, wherein the autonomous alteration changes the pattern without using an external switching apparatus and an external logic.

17. The computer usable program product of claim 9, wherein the program instructions are stored in a computer readable storage device in a data processing system, and wherein the program instructions are transferred over a network from a remote data processing system.

18. The computer usable program product of claim 9, wherein the program instructions are stored in a computer readable storage device in a server data processing system, and wherein the program instructions are downloaded over a network to a remote data processing system for use in a computer readable storage device associated with the remote data processing system.

19. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to configure in an electrical power outlet device, a set of sensors, a first sensor in the set of sensors configured to detect an event in an environment where the electrical power outlet device is supplying power, the environment comprising elements not participating in an electrical circuit that receives power from the electrical circuit, wherein the event is usable by an application executing in the electrical power outlet device to alter a pattern of usage computed at the electrical power outlet device;

program instructions to determine, using the application within the electrical power outlet device, an autonomous modification of an operation of the electrical power outlet device to be performed responsive to at least one of the pattern of usage and the event; and program instructions to perform, by the electrical power outlet device, the autonomous modification at the electrical power outlet device.

20. The computer system of claim 19, wherein when a current drawn from the electrical power outlet device fails to exceed a current threshold, the autonomous modification ceases a flow of the current to an appliance that is electrically coupled to the electrical power outlet device.

* * * * *